(12) United States Patent
Chentanez et al.

(10) Patent No.: US 8,878,856 B1
(45) Date of Patent: Nov. 4, 2014

(54) SYSTEM, METHOD, AND COMPUTER PROGRAM PRODUCT FOR DEPICTING A BODY OF WATER UTILIZING A HEIGHT FIELD AND PARTICLES

(75) Inventors: Nuttapong Chentanez, Zürich (CH); Matthias Heinz Müller-Fischer, Stäfa (CH)

(73) Assignee: NVIDIA Corporation, Santa Clara, CA (US)

( * ) Notice: Subject to any disclaimer, the term of this patent is extended or adjusted under 35 U.S.C. 154(b) by 656 days.

(21) Appl. No.: 12/826,610

(22) Filed: Jun. 29, 2010

(51) Int. Cl.
*G06T 13/40* (2011.01)
*G06T 13/00* (2011.01)

(52) U.S. Cl.
CPC *G06T 13/00* (2013.01); *G06T 13/40* (2013.01)
USPC .................................. 345/473; 703/5; 703/9

(58) Field of Classification Search
USPC .................................. 345/419, 473; 703/9, 5
See application file for complete search history.

(56) References Cited

U.S. PATENT DOCUMENTS

| | | | |
|---|---|---|---|
| 6,266,071 B1 * | 7/2001 | Stam et al. | 345/473 |
| 7,363,198 B2 * | 4/2008 | Balaniuk et al. | 703/2 |
| 7,800,612 B2 * | 9/2010 | Chiu et al. | 345/420 |
| 7,921,003 B2 * | 4/2011 | Miller et al. | 703/9 |
| 7,948,485 B1 * | 5/2011 | Larsen et al. | 345/420 |
| 8,204,725 B1 * | 6/2012 | Thuerey et al. | 703/9 |
| 8,237,722 B2 * | 8/2012 | Johnson | 345/522 |

OTHER PUBLICATIONS

Miklos "Real-Time Fluid Simulation Using Height Fields", 2004.*
Adams, B. et al., "Adaptively Sampled Particle Fluids," Proceedings of ACM SIGGRAPH 2007, ACM Transactions on Graphics, Jul. 2007, pp. 48:1-48:7.
Angst, R. et al., "Robust and Efficient Wave Simulations on Deforming Meshes," Pacific Graphics 2008, 2008, vol. 27, No. 7, pp. 1-6.
Burrell, T. et al., "Advected River Textures," Computer Animation and Virtual Worlds, Jun. 2, 2009, vol. 20, pp. 163-173.
Bridson, R., "Shallow Water Discretization," Lecture Notes Animation Physics—cs533d, Nov. 2005, slides 1-52, retrieved from http://www.cs.ubc.ca/~rbridson/courses/533d-fall-2005//nov17-cs533d-slides.pdf.
Becker, M. et al., "Weakly Compressible SPH for Free Surface Flows," ACM SIGGRAPH Symposium on Computer Animation, 2007, pp. 1-9.
Becker, M. et al., "Direct Forcing for Lagrangian Rigid-Fluid Coupling," IEEE Transactions on Visualization and Computer Graphics, 2008, pp. 1-10.
Batty, C. et al., "Tetrahedral Embedded Boundary Methods for Accurate and Flexible Adaptive Fluids," EUROGRAPHICS 2010, 2010, vol. 29, No. 2, pp. 1-10.
Chentanez, N. et al., "Liquid Simulation on Lattice-Based Tetrahedral Meshes," Eurographics/ACM SIGGRAPH Symposium on Computer Animation 2007, Aug. 3-4, 2007, pp. 219-228.

(Continued)

*Primary Examiner* — Kimbinh T Nguyen
(74) *Attorney, Agent, or Firm* — Zilka-Kotab, PC

(57) ABSTRACT

A system, method, and computer program product are provided for depicting a body of water utilizing a height field and particles. In use, content depicting a body of water is identified. Additionally, a height field is generated for the content. Furthermore, at least a portion of the height field is converted to a plurality of particles based on predetermined criteria.

24 Claims, 6 Drawing Sheets

(56) References Cited

OTHER PUBLICATIONS

Chen, J. et al., "Toward Interactive-Rate Simulation of Fluids with Moving Obstacles Using Navier-Stokes Equations," Graphical Models and Image Processing, Mar. 1995, vol. 57, No. 2, pp. 107-116.
Crane, K. et al., "Real Time Simulation and Rendering of 3D Fluids," GPU Gems 3, Aug. 2007, Chapter 30, pp. 633-675.
Cummins, S. et al., "An SPH Projection Method," Journal of Computational Physics, 1999, pp. 584-607.
Desbrun, M. et al., "Smoothed Particles: A New Paradigm for Animating Highly Deformable Bodies," Eurographics Workshop on Computer Animation and Simulation, EGCAS '96, Aug. 1996, pp. 61-76.
Enright, D. et al., "Animation and Rendering of Complex Water Surfaces," ACM, 2002, pp. 736-744.
Foster, N. et al., "Practical Animation of Liquids," Proceedings of the 28th Annual Conference on Computer Graphics and Interactive Techniques, 2001, pp. 23-30.
Foster, N. et al., "Realistic Animation of Liquids," Graphical Models and Image Processing, Sep. 1996, vol. 58, No. 5, Article No. 0039, pp. 471-483.
Foster N. et al., "Controlling Fluid Animation," Proceedings of the Computer Graphics International (CGI '97), 1997 pp. 178-188.
Fournier, A. et al., "A Simple Model of Ocean Waves," SIGGRAPH '86, vol. 20, No. 4, Aug. 18-22, 1986, pp. 75-84.
Sin, F. et al., "A Point-Based Method for Animating Incompressible Flow," Eurographics/ACM SIGGRAPH Symposium on Computer Animation, 2009, pp. 1-9.
Hu, X. Y. et al., "An Incompressible Multi-Phase SPH Method," Journal of Computational Physics, 2007, vol. 227, pp. 264-278.
Hagen, T.R. et al., "Visual Simulation of Shallow-Water Waves," Preprint submitted to Elsevier Science, Jul. 20, 2005, pp. 1-12.
Harada, T. et al., "Smoothed Particle Hydrodynamics on GPUs," Proceeding of Computer Graphics International, 2007, pp. 63-70.
Hinsinger, D. et al., "Interactive Animation of Ocean Waves," Proceedings of the 2002 ACM SIGGRAPH/ Eurographics Symposium on Computer Animation, 2002, pp. 161-166.
Holmberg, N. et al., "Efficient Modeling and Rendering of Turbulent Water Over Natural Terrain," Proceedings of the 2nd international Conference on Computer Graphics and Interactive Techniques in Australasia and South East Asia, 2004, pp. 15-22.
Irving, G. et al., "Efficient Simulation of Large Bodies of Water by Coupling Two and Three Dimensional Techniques," SIGGRAPH '06 ACM SIGGRAPH 2006 Papers, 2006, pp. 805-811.
Johnson, S. G., "Notes on Perfectly Matched Layers (PMLs)," Jul. 19, 2008, pp. 1-16.
Kim, J. et al., "Practical Animation of Turbulent Splashing Water," Eurographics / ACM SIGGRAPH Symposium on Computer Animation, 2006, pp. 1-10.
Kass, M. et al., "Rapid, Stable Fluid Dynamics for Computer Graphics," Computer Graphics, Aug. 1990, vol. 24, No. 4, pp. 49-57.
Kim, D. et al., "A Semi-Lagrangian CIP Fluid Solver without Dimensional Splitting," EUROGRAPHICS 2008, 2008, vol. 27, No. 2, pp. 1-9.
Kipfer, P. et al., "Realistic and Interactive Simulation of Rivers," GI '06 Proceedings of Graphics Interface 2006, 2006, pp. 41-48.
Losasso, F. et al., "Simulating Water and Smoke with an Octree Data Structure," Proceedings of ACM SIGGRAPH 2004, Aug. 2004, vol. 23, Issue 3, pp. 457-462.
Liu, J. et al., "A Hybrid Particle-Mesh Method for Viscous, Incompressible, Multiphase Flows," Journal of Computational Physics, Jan. 2005, vol. 202, Issue 1, pp. 65-93.
Lee, R. et al., "A Fast and Compact Solver for the Shallow Water Equations," 4th Workshop in Virtual Reality Interactions and Physics Simulation, 2007, pp. 51-57.
Long, B. et al., "Real-Time Fluid Simulation using Discrete Sine/ Cosine Transforms," Proceedings of the 2009 Symposium on Interactive 3D Graphics and Games, 2009, pp. 99-106.
Jensen, L. S., "Deep-Water Animation and Rendering," Sep. 26, 2001, pp. 1-26, retrieved from http://www.gamasutra.com/gdce/2001/jensen/jensen_pfv.htm.
Losasso, F. et al., "Two-Way Coupled SPH and Particle Level Set Fluid Simulation," IEEE Transactions on Visualization and Computer Graphics, Jul./Aug. 2008, vol. 14, No. 4, pp. 797-804.
Layton, A. T. et al., "A Numerically Efficient and Stable Algorithm for Animating Water Waves," The Visual Computer, Jan. 24, 2002, vol. 18, pp. 41-53.
Max, N. et al., "Flow Visualization Using Moving Textures," 1996, pp. 1-11.
Muller, M. et al., "Particle-Based Fluid Simulation for Interactive Applications," Eurographics/SIGGRAPH Symposium on Computer Animation, 2003, pp. 1-7.
Maes, M. et al., "Efficient Animation of Water Flow on Irregular Terrains," GRAPHITE '06: Proceedings of the 4th International Conference on Computer Graphics and Interactive Techniques in Austalasia and Southeast Asia, 2006, pp. 107-115.
Mihalef, V. et al., "Simulation of Two-Phase Flow with Sub-Scale Droplet and Bubble Effects," EUROGRAPHICS 2009, vol. 28, No. 2, pp. 1-10.
Monaghan, J. J., "Smoothed Particle Hydrodynamics," Annual Review of Astronomy and Astrophysics, 1992, vol. 30, pp. 543-574.
Muller, M. et al., "Interaction of Fluids with Deformable Solids," Computer Animation and Virtual Worlds, Jul. 2004, vol. 15, Issue 3-4, pp. 159-171.
Mastin, G. A. et al., "Fourier Synthesis of Ocean Scenes," IEEE Computer Graphics and Application, Mar. 1987, pp. 16-23.
Neyret, F. et al., "Advected Textures," Eurographics/ SIGGRAPH Symposium on Computer Animation, 2003, pp. 1-7.
O'Brien, J. F. et al., "Dynamic Simulation of Splashing Fluids," Proceedings of the Computer Animation '95, Apr. 19-21, 1995, pp. 198-205.
Peachy, D. R., "Modeling Waves and Surf," SIGGRAPH '86, Aug. 18-22, 1986, vol. 20, No. 4, pp. 65-74.
Premoze, S. et al., "Particle-Based Simulation of Fluids," EUROGRAPHICS 2003, 2003, vol. 22, No. 3, pp. 1-10.
Van Der Laan, W. J. et al., "Screen Space Fluid Rendering with Curvature Flow," Proceedings of the 2009 Symposium on Interactive 3D Graphics and Games, 2009, pp. 91-98.
Selle, A. et al., "An Unconditionally Stable MacCormack Method," Journal of Scientific Computing, Jun. 2008, vol. 35, Issue 2-3, pp. 350-371.
Soderstrom, A. et al., "Non-Reflective Boundary Conditions for Incompressible Free Surface Fluids," SIGGRAPH 2009, Aug. 3-7, 2009.
Solenthaler, B. et al., "Predictive-Corrective Incompressible SPH," ACM Transactions on Graphics, Aug. 2009, vol. 28, No. 3, Article 40, pp. 1-6.
Thon, S. et al., "Ocean Waves Synthesis Using a Spectrum-Based Turbulence Function," IEEE, 2000, pp. 1-8.
Tessendorf, J., "Simulating Ocean Water," In Siggraph Course Notes, 1999, pp. 3/1-3/19.
Takahashi, T. et al., "Realistic Animation of Fluid with Splash and Foam," EUROGRAPHICS 2003, 2003, pp. 391-400.
Thurey, N. et al., "Real-Time Breaking Waves for Shallow Water Simulations," Proceedings of the 15th Pacific Conference on Computer Graphics and Applications, 2007, pp. 39-46.
Thurey, N. et al., "Real-Time Simulations of Bubbles and Foam within a Shallow Water Framework," Eurographics/ ACM SIGGRAPH Symposium on Computer Animation, Aug. 4-5, 2007, pp. 1-8.
St'ava, O. et al., "Interactive Terrain Modeling Using Hydraulic Erosion," Eurographics/ ACM SIGGRAPH Symposium on Computer Animation, 2008, pp. 1-10.
Hess, P., "Extended Boundary Conditions for Shallow Water Simulations," Master Thesis, Sep. 2007, pp. 1-56.

(56) References Cited

OTHER PUBLICATIONS

Wang, H. et al., "Solving General Shallow Wave Equations on Surfaces," Eurographics/ SIGGRAPH Symposium on Computer Animation, Aug. 4-5, 2007, pp. 1-10.

Yuksel, C. et al., "Wave Particles," ACM Transactions on Graphics, Aug. 5, 2007, vol. 26, No. 3, pp. 1-8.

Yu, Q. et al., "Scalable Real-Time Animation of Rivers," EUROGRAPHICS 2009, 2009, vol. 28, No. 2, pp. 1-10.

Zhu, Y. et al., "Animating Sand as a Fluid," ACM SIGGRAPH 2005 Papers, Jul. 2005, pp. 965-972.

Mould, D. et al., "Modeling Water for Computer Graphics," Computer and Graphics, 1997, vol. 21, No. 6, pp. 801-814.

* cited by examiner

SYSTEM, METHOD, AND COMPUTER PROGRAM PRODUCT FOR DEPICTING A BODY OF WATER UTILIZING A HEIGHT FIELD AND PARTICLES

FIELD OF THE INVENTION

The present invention relates to graphics, and more particularly to depicting bodies of water.

BACKGROUND

In recent years, physically based effects have become more and more popular in computer games. Features that used to be hand-animated are now driven by simulators. Some examples include rigid bodies and particles. However, in most cases, bodies of water such as rivers, lakes or oceans are still animated using procedural approaches.

For example, this often is a result of the large simulation domain in these scenarios [e.g. to get details on the surface of a lake using a full three-dimensional (3D) fluid simulation would generally require millions of grid cells if a Eulerian technique is used or millions of particles if a smoothed-particle hydrodynamics (SPH) approach is used]. For real-time applications, such as computer games, the problem may be reduced from 3D to 2D by treating the body of water as a two-dimensional (2D) height field. Unfortunately, while this may reduce simulation time substantially, phenomena like waterfalls or overturning waves cannot be represented by the 2D height field.

There is thus a need for addressing these and/or other issues associated with the prior art.

SUMMARY

A system, method, and computer program product are provided for depicting a body of water utilizing a height field and particles. In use, content depicting a body of water is identified. Additionally, a height field is generated for the content. Furthermore, at least a portion of the height field is converted to a plurality of particles based on predetermined criteria.

DETAILED DESCRIPTION

Figure 1:
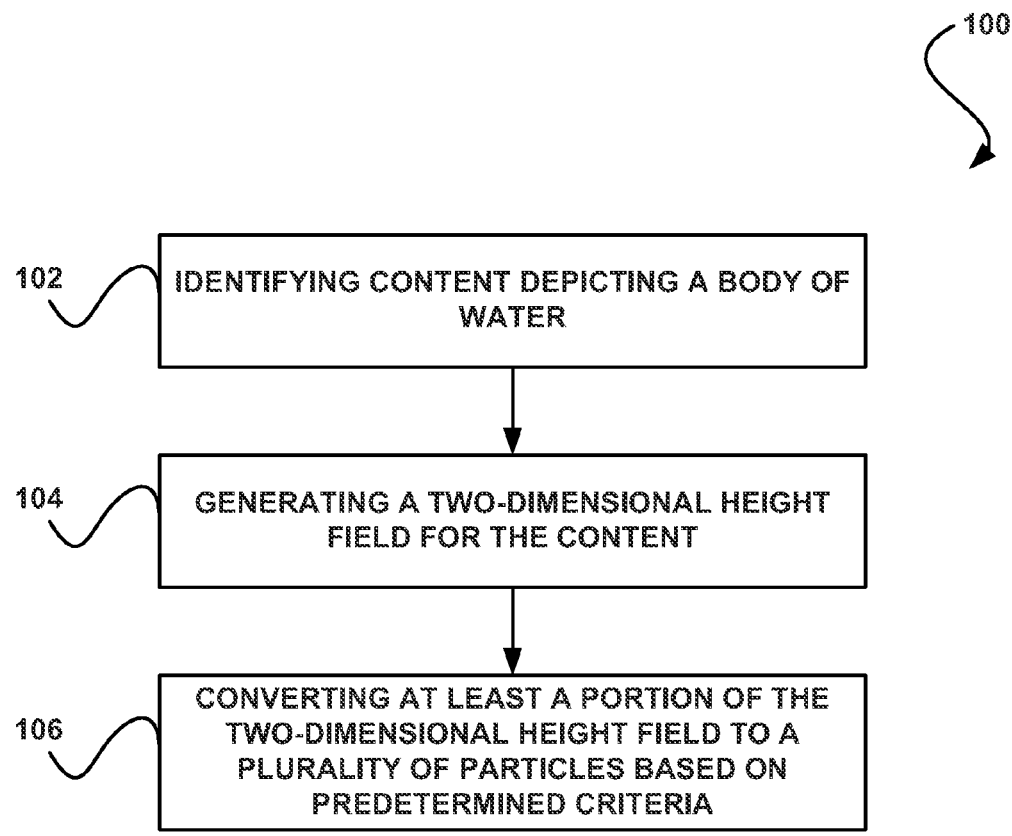
FIG. 1 shows a method for depicting a body of water utilizing a height field and particles, in accordance with one embodiment.

FIG. 1 shows a method for depicting a body of water utilizing a height field and particles, in accordance with one embodiment. As shown in operation 102, content depicting a body of water is identified. With respect to the present description, the content may include any graphical content intended for display which depicts a body of water. Thus, display of the content may result in display of an image of the body of water.

In one embodiment, the content may only depict the body of water. In another embodiment, the content may depict the body of water in combination with a solid body. It should be noted that the body of water may include any region of liquid, such as a lake, ocean, etc. Further, the solid body may include any region of solid mass, such as a mountain, rock, etc.

In one embodiment, the content may be identified in response to a determination that the depicted body of water is of at least a predetermined size. For example, only bodies of water of a size synonymous with a lake, ocean, etc. may be identified. In another embodiment, the content may be identified in response to a determination that the depicted body of water is of a predetermined type of body of water. For example, only bodies of water depicting a lake, ocean, etc. may be identified.

In yet another embodiment, the content may be identified in response to a determination that the content is currently being displayed by a display device. Thus, only content being displayed by a display device (e.g. computer monitor, television, etc.) may be identified, as an option. In this way, the method 100 may only be implemented with respect to content depicting a body of water that is in the process of being displayed (e.g. to a user, etc.).

Additionally, a height field is generated for the content. Note operation 104. With respect to the present description, the height field may include a data structure storing surface values for the content, such as height values from a base (e.g. "floor") value and velocity values at that point. To this end, the height field may include a two-dimensional representation of a surface of the body of water.

In one embodiment, the height field may be generated for only a portion of the content depicting the body of water. In another embodiment, generating the height field may include simulating the height field for the content. Various known techniques may be utilized for generating the height field, such as the shallow water equations (SWE) described in "A numerically efficient and stable algorithm for animating water waves," by Anita T. Layton, Michiel Van de Panne (*The Visual Computer* 18, 1 (2002), 41-53.

As an option, the height field may be updated based on gravity. Also another option, the height field may be updated based on external forces. As yet another option, the height field may be updated based on boundary conditions. Examples of updating the height field based on gravity, external forces, and boundary conditions will be described in more detail below with respect to FIG. 2.

Furthermore, as shown in operation 106, at least a portion of the height field is converted to a plurality of particles based on predetermined criteria. In one embodiment, the portion of the height field may be identified based on the predetermined criteria for converting the same to the particles. In this way, only portions of the height field representing portions of the body of water that meet the predetermined criteria may be identified and converted to the particles.

In one embodiment, the predetermined criteria may include a predetermined surface type. For example, only portions of the body of water having the predetermined surface type may be converted to the particles. Such predetermined surface type may optionally include breaking waves, waterfalls, and/or splashing water.

In another embodiment, the predetermined criteria may include interaction with a depicted solid body. For example, only portions of the body of water interacting with the depicted solid body may be converted to the particles. The solid body may include a rigid body and/or soft body, as an option.

In still yet another embodiment, the predetermined criteria may sources of water, such that only portions of the body of water coming from a source (with respect to the depiction) matching the sources defined by predetermined criteria may be converted to the particles. For example, the predetermined criteria may include faucets, pouring water, and/or raindrops.

Moreover, the particles to which the portion of the height field identified based on the predetermined criteria is converted may include spray, splash, and foam. The spray and splash particles may represent parts of the body of water that break free from the height field. The spray particles may be small, fast moving droplets, while the splash particles may represent the remainder. The foam particles may represent foam that floats on the surface of the body of water.

In one embodiment, the portion of the height field identified based on the predetermined criteria may be converted to the particles using smoothed-particle hydrodynamics (SPH). In another embodiment, the portion of the height field identified based on the predetermined criteria may be converted to the particles by treating such portion of the height field as non-interacting point masses. Of course, however, the portion of the height field identified based on the predetermined criteria may be converted utilizing any known technique for generating particles from a height field.

By converting the portions of the height field meeting the predetermined criteria (e.g. having small scale detail) to particles, the body of water may be simulated with small scale detail in real-time. Thus, a realistic water scenario with both large and small scale features may be simulated. It should be noted that the method 100 may be implemented by a central processing unit (CPU) and/or graphics processing unit (GPU).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
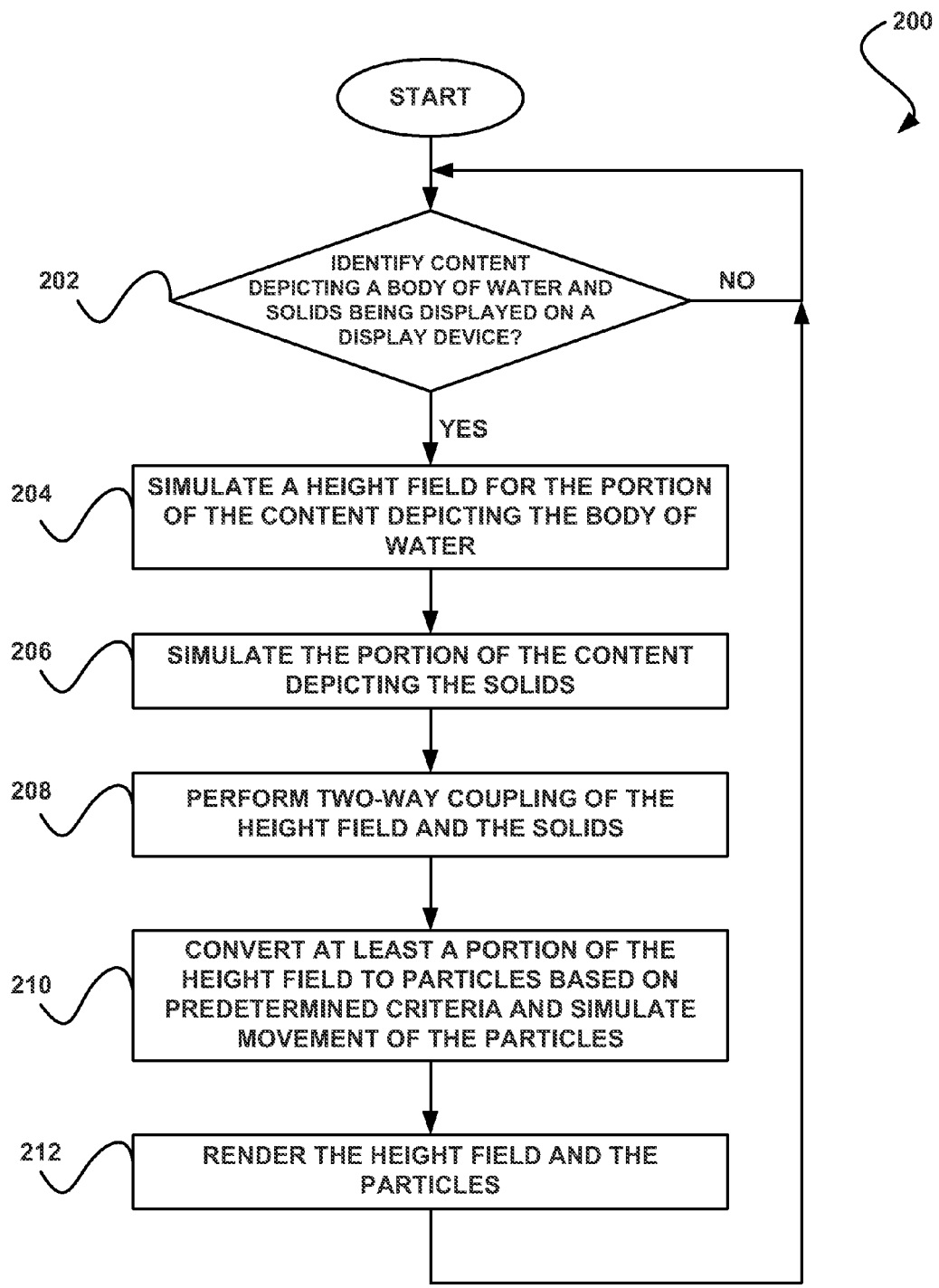
FIG. 2 shows a method for rendering content depicting a body of water and solids, by depicting the body of water utilizing a height field and particles, in accordance with another embodiment.

FIG. 2 shows a method 200 for rendering content depicting a body of water and solids, by depicting the body of water utilizing a height field and particles, in accordance with another embodiment. As an option, the present method 200 may be carried out in the context of the method 100 of FIG. 1. Of course, however, the method 200 may be carried out any desired environment. It should also be noted that the aforementioned definitions may apply during the present description.

As shown in decision 202, it is determined whether content depicting a body of water and solids is being displayed on a display device. For example, the determination may include identifying graphical content, such as an image (or series of images), depicting the body of water and the solids which is to be processed (e.g. by a CPU, GPU, etc.) for display on the display device. Thus, the determination may optionally be based on content to be displayed on the display device, and not necessarily content that is presently being displayed on the display device.

If it is determined in decision 202 that the aforementioned content is not being displayed on the display device, the method 200 continues to wait for a determination that content depicting a body of water and solids is being displayed on a display device. If, however, it is determined in decision 202 that the aforementioned content is being displayed on the display device, a height field is simulated for the portion of the content depicting the body of water. Optionally, gravity, external forces, and boundary conditions may be taken into account with respect to the simulation of the height field, as described below.

In one embodiment, SWE may be employed which may simplify the full Navier-Stokes equations to a 2D height field representation of the liquid surface of the body of water. As an option, gravity may be assumed to act along the y-axis. Hence the plane for the 2D simulation may be the x-z plane. Table 1 illustrates one example of the SWE. It should be noted that the example shown in Table 1 is set forth for illustrative purposes only, and thus should not be construed as limiting in any manner.

TABLE 1

| | |
|---|---|
| $\frac{Dh}{Dt} = -h\nabla \cdot v$ | Equation 1 |
| $\frac{Dv}{Dt} = -g\nabla \eta + a^{ext}$ | Equation 2 |

In the example shown in Table 1, h is the depth of the water, H is the y-coordinate of the terrain on the bottom surface (underneath the water), $\eta=H+h$ is the y-coordinate of the water surface, $v=(u, w)$ is the horizontal velocity of the fluid, g is gravity and $a_{ext}$ is an external acceleration. Further, D is the material derivative operator. The equations shown in Table 1 describe conservation of mass and conservation of momentum. Optionally, explicit integration may be utilized and the terms that can lead to instability may be handled specially, as further described below.

In another embodiment, the simulation domain is discretized with a staggered grid where the heights $h_{i,j}$ and $H_{i,j}$ are stored at the cell centers and the velocities components $u_{i+1/2,j}$, $w_{i,j+1/2}$ on faces, for example, as described in "Shallow water discretization" by R. Bridson (lecture notes animation physics, university of British Columbia, 2005). A time-splitting technique may be employed by first solving the self advection of the velocity field and then integrating the height field and velocity field forward in time. It should be noted that while meter (m) for distance and second (s) for time are used as the units with respect to the present embodiments, any other units maybe utilized. The grid spacing and time steps may be denoted by $\Delta x$ and $\Delta t$, respectively.

The advection of $u_{i+1/2,j}$, $v_{i,j+1/2}$ may be solved using an unconditionally stable modified MacCormack method as in "An unconditionally stable MacCormack method" by A. Selle, R. Fedkiw, B. Kim, Y. Liu, and J. Rossignac (J. Sci. Comput. 35, 2-3 (2008), 350-371) and fall back to the semi-Lagrangian method if the resulting value is not within the bounds of the velocity values used for bilinear interpolation of the first semi-Lagrangian sub-step as also suggested in the aforementioned paper.

As described in "Extended Boundary Conditions for Shallow Water Simulations" by P. Hess, N. Thuerey, and M. Gross (Master's thesis, ETH Zurich, 2007), the Equation 1 shown in Table 1 above may be rewritten as shown in Table 2. Again, the equation shown in Table 2 is set forth for illustrative purposes only, and thus should not be construed as limiting in any manner.

TABLE 2

Equation 3: $\frac{\partial h}{\partial t} = -\nabla \cdot (hv)$

Equation 3 may then be discretized, resulting in the equation shown in Table 3, which is also set forth for illustrative purposes only.

TABLE 3

Equation 4: $\frac{\partial h_{i,j}}{\partial t} = -\left(\frac{(\bar{h}u)_{i+\frac{1}{2},j} - (\bar{h}u)_{i-\frac{1}{2},j}}{\Delta x} + \frac{(\bar{h}w)_{i,j+\frac{1}{2}} - (\bar{h}w)_{i,j-\frac{1}{2}}}{\Delta x}\right)$, where $\bar{h}$ is h evaluated in the upwind direction $$\bar{h}_{i+\frac{1}{2},j} = \begin{cases} h_{i+1,j} & \text{if } u_{i+\frac{1}{2},j} \leq 0 \\ h_{i,j} & \text{if } u_{i+\frac{1}{2},j} > 0 \end{cases} \quad \text{Equation 5}$$

and $$\bar{h}_{i,j+\frac{1}{2}} = \begin{cases} h_{i,j+1} & \text{if } w_{i,j+\frac{1}{2}} \leq 0 \\ h_{i,j} & \text{if } w_{i,j+\frac{1}{2}} > 0 \end{cases} \quad \text{Equation 6}$$

The height may then be integrated explicitly using the equation shown in Table 4, which is set forth for illustrative purposes only.

TABLE 4

Equation 7: $h_{i,j} \mathrel{+}= \frac{(\partial h_{i,j})}{(\partial t)}\Delta t$ This may guarantee mass conservation for the height integration step. Furthermore, this step may be modified to take the discontinuity of waterfalls into account, as described in detail below.

Still yet, the face velocities may be updated by taking the gradient of the water height into account as shown in Table 5, which is set forth for illustrative purposes only.

TABLE 5

Equation 8: $u_{i+\frac{1}{2},j} \mathrel{+}= \left(\frac{-g}{\Delta x}(\eta_{i+1,j} - \eta_{i,j}) = a_x^{ext}\right)\Delta t$ Equation 9: $w_{i,j+\frac{1}{2}} \mathrel{+}= \left(\frac{-g}{\Delta x}(\eta_{i,j+1} - \eta_{i,j}) + a_z^{ext}\right)\Delta t$ As an option, this step may also be modified to take the discontinuity of waterfalls into account, as described in detail below.

Further, with respect to boundary conditions, for a face that is marked (e.g. by a user) as reflective, such as walls or permanent static obstacles, the velocity value may optionally be always set to 0 at the end of every time step and may not be updated in the advection step. Moreover, a face (i+½, j) may be treated as reflective if either of the following is true:

$h_{i,j} \leq \epsilon$ and $H_{i,j} > \eta_{i+1,j}$ or $h_{i+1,j} \leq \epsilon$ and $H_{i+1,j} > \eta_{i,j}$ where $\epsilon > 0$ is a small constant. $10^{-4} \Delta x$ may be used in various examples. A similar condition may apply to a face (i, j+½). Conceptually, the water level in a wet cell may need to be higher than the terrain level in the neighboring dry cell before the flow starts. Otherwise, the face may behave as a wall.

To simulate open water scenes, borders that absorb all incoming waves may be utilized. For example, the rest water level may be taken into account and stability may be provided. For example, a damping region may be defined near the border of the domain and waves may be made fast enough within that region decay such that their amplitudes are negligible when they hit the border. To damp out the waves that move along the x-axis, a field $\phi$, defined only in the damping region, may be evolved. The field may be initialized to 0 and then used to update h and u as shown in Equations 10-13 shown in Table 6, which is set forth for illustrative purposes only.

TABLE 6

Equation 10: $h_{i,j} \mathrel{+}= (-\sigma_{i,j}(h_{i,j} - h_{rest}) + \phi_{i,j})\Delta t$ Equation 11: $u_{i+\frac{1}{2},j} \mathrel{+}= -\frac{1}{2}(\sigma_{i+1,j} + \sigma_{i,j})u_{i+\frac{1}{2},j}\Delta t$ Equation 12: $\phi_{i,j} \mathrel{+}= -\lambda_{update}\sigma_{i,j}\frac{\left(w_{i,j+\frac{1}{2}} - w_{i,j-\frac{1}{2}}\right)}{(\Delta x)}\Delta t$ Equation 13: $\phi_{i,j} \mathrel{\times}= \lambda_{decay}$ $\phi_{i,j} \times = \lambda_{decay}$      Equation 13:

In Equations 10-13 shown above, the constant $\sigma_{i,j}$ controls how fast the wave's amplitudes decay, $h_{rest}$ is the depth of the water at rest and $0 < \lambda_{decay} < 1$ and $0 < \lambda_{update} < 1$ are constants to help improve the stability of the explicit Euler time integration. $\sigma_{i,j}$ may increase quadratically or cubically from the inner edge of the damping region to the domain border. Large $\sigma_{i,j}$ may result in a faster decay and allow narrower damping regions but may introduce numerical reflection when a wave is about to enter the region. $\lambda_{decay} = 0.9$ and $\lambda_{update} = 0.1$ may optionally be used in various examples. Waves moving in other directions may be damped by the above method with an attenuation factor proportional to the cosine of the angle of the direction with the x-axis. To sufficiently damp the waves moving in all directions, a similar formulation may be used for the z-axis (see Appendix A). In various examples, the width of the damping region may be 10 cells. In one example, the top and the bottom borders may be absorbing z-moving waves while the left and the right borders may be reflective. In such example, waves may reflect only from the left and right borders.

Several measures may be used to improve the stability of the simulation without losing much visual quality. Due to numerical error, $h_{i,j}$ can become smaller than zero which is not physical and can cause stability issues. Therefore, $h_{i,j}$ may be clamped to always be $\geq 0$.

The magnitudes of $u_{i+1/2,j}$, $v_{i,j+1/2}$ may also be clamped to be less than $\alpha^*(\Delta x/\Delta t)$, where $\alpha^* = 0.5$ in various examples.

This may place a limit on the wave speed within the simulation, but may greatly improve the stability for scenes with violent water.

Additionally, the water depth used for the height integration may be limited by replacing $\bar{h}$ in Equation 4 above by $\bar{h}-h_{adj}$, where $$h_{adj} = \max\left(0, \frac{\bar{h}_{i+1,j} + \bar{h}_{i-1,j} + \bar{h}_{i,j+1} + \bar{h}_{i,j-1}}{4} - h_{avgmax}\right)$$

and $$h_{avgmax} = \beta \frac{\Delta x}{g \Delta t}.$$

$\beta=2.0$ may be in various examples. This may place a limit on the wave lengths and amplitudes in deep water regions, but improve the stability of the simulation while still producing plausible results.

When a wave from deeper waters enters a shallower region, its amplitude may increase and the wavelength decrease. Eventually, the wave lengths may become smaller than $\Delta x$ and may not be resolved by the grid anymore but may become numerical ripples instead. The use of explicit integration may make the situation worse as it tends to amplify the edge of the first wave front that enters the shallower water region. This may manifest itself as overshooting artifacts in the simulation result.

Two techniques may be employed to reduce this artifact. First, the waves may be damped with wave length less than $\Delta x$. To damp a wave moving along the x-axis it may be checked whether $$(\max_{k=-2}^{k=2} \eta_{i+k,j} - \min_{k=-2}^{k=2} \eta_{i+k,j} > \lambda_{ring})$$

and $$\eta_{i-2,j} > \eta_{i-2,j} < \eta_{i,j} > \eta_{i+1,j} < \eta_{i+2,j}$$

or $$\eta_{i-2,j} < \eta_{i-2,j} > \eta_{i,j} < \eta_{i+1,j} > \eta_{i+2,j}.$$

If so, the following update be used:

$$h_{i,j} += \alpha_{ring}\left(\max\left(0, \frac{1}{5}\sum_{k=-2}^{k=2} \eta_{i+k,j} - H_{i,j}\right) - h_{i,j}\right).$$

$\lambda_{edge}=2\Delta x$ and $0.1 < \alpha_{edge} < 0.5$ may be used in the examples. A similar fix may be used to waves moving along the z-axis. This may reduce the overshooting for waves traveling in other directions as well, albeit possibly less effective. These corrections may effectively reduce the "ringing" artifacts.

Still yet, as shown in operation 206, the portion of the content depicting the solids is simulated. The solids may include rigid bodies and/or soft bodies, for example. Thus, a portion of the content depicting a solid body may be identified, such that the solid body may be simulated.

Further, two-way coupling of the height field and the solids is performed. Note operation 208. As shown, such two-way coupling of the height field and the solids may be performed prior to converting at least a portion of the height field to particles, for identifying the at least a portion of the height field to be converted to particles based on predetermined criteria. For example, forces that the body of water exerts on the solids (e.g. buoyancy, drag, lift, etc.) may be computed and applied, and the body of water's height field and velocity field may be modified to take the movement of the solids into account, as described below.

Figure 3A:
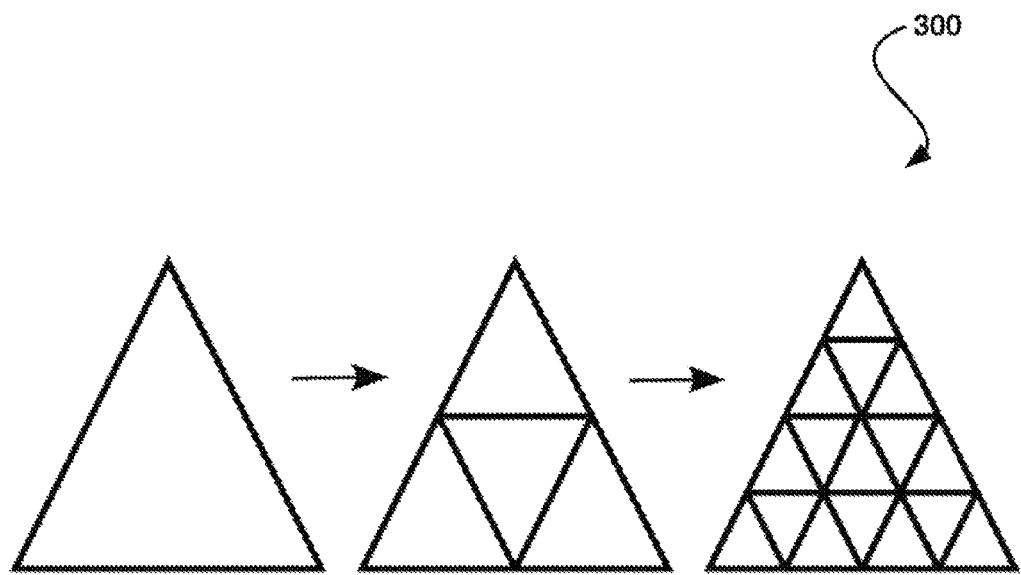
FIGS. 3A-B show a method for estimating a solid submerged under a body of water, in accordance with yet another embodiment.
Figure 3B:
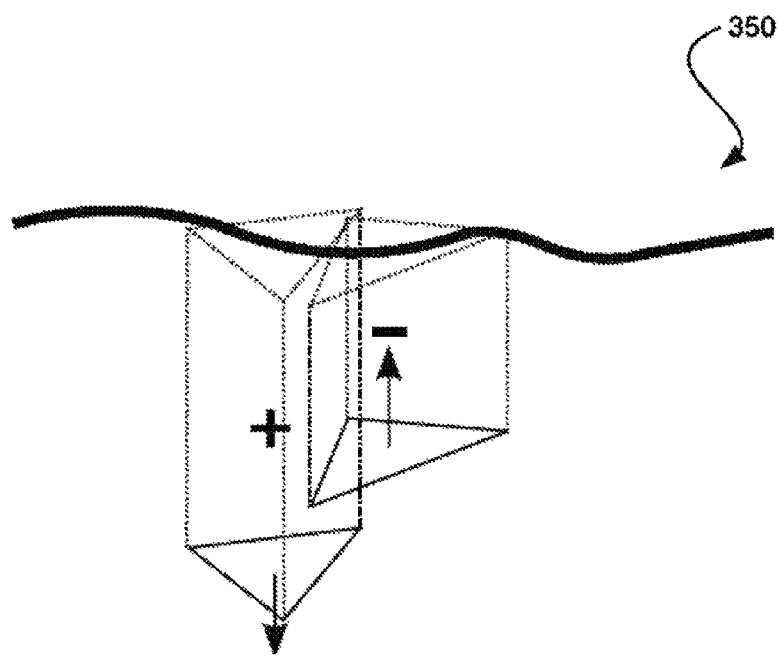

In one embodiment, the coupling of solids (e.g. rigid and soft bodies as described herein) with the height field fluid may be handled in parallel. For example, for all the triangles of the rigid bodies and the soft bodies, each triangle may be recursively divided into smaller similar sub-triangles until the area of these sub-triangles falls below $\kappa \Delta x^2$, as shown in FIG. 3A. With decreasing $\kappa$ the force computation may become more accurate but also more expensive. $\kappa=1$ may be used in various examples. The forces acting on these sub-triangles can be computed in parallel. The effect of these sub-triangles on the fluid grid can also be computed and written in parallel using atomic operations.

Let $p=[P_x, p_y, p_z]^T$ and $v=[v_x, v_y, v_z]$ be the position and velocity of the centroid of a sub-triangle, A to be the area of the sub-triangle, p and v are obtained by barycentric interpolation from the corresponding original triangle. Let $n=[n_x, n_y, n_z]^T$ be the normal vector of the triangle.

In one embodiment, the forces that the fluid exerts on a solid may be modeled by taking three major components into account, namely buoyancy, drag and lift forces. Buoyancy may be an upward pointing force proportional to the weight of the displaced fluid. It can be computed as $-gpV$, where V is the volume of the object below the water surface. V may be estimated by adding and subtracting the volumes of the prisms formed by projecting the triangle along the y-axis to the water surface. Volume may be added for the downward facing triangles and subtracted for the upward facing triangles, as shown in FIG. 4B.

The contribution of a sub-triangle to the buoyancy force may be that shown in Table 7, which is set forth for illustrative purposes only. It should be noted that $\hat{y}$ denotes the unit vector $[0, 1, 0]^T$, with respect to the present embodiments.

Table 7

$$f^{bouyancy} = \begin{cases} 0 & \text{if } \eta(p) < p_y \\ g\rho A(\eta(p) - p_y)n_y\hat{y} & \text{else,} \end{cases} \quad \text{Equation 14}$$

where $\eta(p)$ is the water level at p, evaluated by a bi-linear interpolation.

The drag and lift forces may be computed as shown in Table 8, which is also set forth for illustrative purposes only.

TABLE 8

Equation 15: $f^{drag} = -\frac{1}{2}C_D A^{eff} |v_{rel}| v_{rel}$

Equation 16: $f^{lift} = -\frac{1}{2}C_L A^{eff} |v_{rel}|\left(v_{rel} \times \frac{n \times v_{rel}}{|n \times v_{rel}|}\right)$ where $C_D$ and $C_L$ are the drag and lift coefficients, $v_{rel}=v-v_{fluid}$ is the relative velocity of the sub-triangle with respect to the fluid. It should be noted that $$v_{fluid} = \left[u, u\frac{\partial \eta}{x} + w\frac{\partial \eta}{x}, w\right]^T.$$

$A^{eff}$ is the effective area of the sub-triangle, which may depend on the overall structure of the solid. It is computed as shown in Table 9, which is also set forth for illustrative purposes only.

TABLE 8

Equation 17: $A^{eff} = \begin{cases} 0 & \text{if } \eta(p) < p_y \text{ or } n \cdot v_{rel} < 0 \\ \left(\frac{n \cdot v_{rel}}{|v_{rel}|}\omega + (1-\omega)\right)A & \text{otherwise,} \end{cases}$ where $0 \leq \Omega \leq 1$ is a user defined parameter for adjusting the effective area.

The force $f^{bouyancy} + f^{drag} + f^{lift}$ at position p may be added to the corresponding solid the sub-triangle belongs to. In the case the solid is a soft body, the force may be distributed to the three vertices of the original triangle weighted by the barycentric coordinates.

Further, the height and the velocity of the fluid may be modified due to solids using the algorithm shown in Table 9, which is also set forth for illustrative purposes only.

TABLE 9

$\text{num\_substeps} = \max\left(1, \left\lfloor |v - v_y \hat{y}|\frac{\Delta r}{\Delta x} + 0.5 \right\rfloor\right)$ $V_{disp} = n \cdot v_{rel} A \Delta t$
sign $= (n_y > 0)?1:-1$
for q = 1 to num_substeps do $p_s = p + v\frac{q\Delta t}{\text{num\_substeps}}$ (i, j) = closest_gridpoint(p)
depth $= \eta_{i,j} - p_y$
if depth > 0 then
   decay $= e^{\lambda(-depth)}$ $h_{i,j} \mathrel{+}= \text{decay}\frac{V_{disp}}{\text{num\_substeps}(\Delta x)^2}C_{dis}$ $\text{coef} = \min\left(1.0, \text{decay}C_{adapt}\frac{\text{depth}}{\eta_{i,j}}\text{sign}\frac{\Delta t}{(\Delta x)^2}A\right)$ $u_{i+\frac{1}{2},j} \mathrel{+}= \text{coef}\left(v_x - u_{i+\frac{1}{2},j}\right)$ $v_{i,j+\frac{1}{2}} \mathrel{+}= \text{coef}\left(v_z - v_{i,j+\frac{1}{2}}\right)$ end if
end for During a time step, a fast moving object may pass through many grid cells. In that case the changes to the grid cells and faces may be applied to all the cells along the path. The effect of solids on the fluid may also be reduced exponentially with increasing distance to the surface. The decay rate $\lambda > 0$ may be set to 1 in various examples. $C_{dis} > 0$ and $C_{adapt} > 0$ may control how much the solid effects the fluid height and velocity respectively. $C_{dis}=1.0$ and $C_{adapt}=0.2$ may be used in various examples. The height change may depend on the amount of volume that the triangle sweeps through the fluid during that sub time-step, $V_{disp}$/num_substeps, divided by the area of the cell, $(\Delta x)^2$.

As shown in operation 210, at least a portion of the height field is converted to particles based on predetermined criteria, and movement of the particles is simulated. For example, as described below, particles may be generated to replace regions of the body of water that cannot be well resolved with the height field, and the movement of the particles is simulated (e.g. such that they may be eliminated if the particles fall back into the height field).

Three types of particle may be employed in the simulator: spray, splash and foam. Spray and splash particles may represent parts of liquid that break free from the height field. Spray particles may be small, fast moving droplets while splash particles may represent the remainder. Foam particles may represent foam that floats on the surface of the body of water. Spray, splash and foam particles may be generated within the simulation framework from breaking waves, waterfalls and interaction of solids with the body of water. In addition, the particles can be generated explicitly by user defined sources such as faucets, pouring waters or rain drops.

For spray and splash, an SPH simulation may be used or the particles may be moved ballistically without particle-particle interaction. In the case of using SPH, spray and splash particles may be distinguished by using a density threshold. In the case of ballistic particles, the spray and splash particles may need to be generated separately and simulated using different drag coefficients. When a particle is generated from a grid cell, it may take away some mass and momentum from the height field. When it falls back, it may deposit its mass and momentum back at another location. If a particle is of radius r, the height that will be added/subtracted may be $(V_{eff})/((\Delta x)^2)$, where $V_{eff} = C_{deposit}(4/3)\pi r^3$ is the amplified volume of the particles, $C_{deposit} \geq 1$ makes the volume of the particles more than it physically is. $C_{deposit}$ can be used to control the number of particles active in the simulation. The values of $C_{deposit}$ between 1 and 10 may be used in various examples. For example, let $u_{i+1/2,j}$ be the nearest velocity along x-axis sample that a particle falls into, $v^{par} = [v_x^{par}, v_y^{par}, v_z^{par}]^T$ be its velocity. $u_{i+1/2,j}$ can be updated using Equation 18 shown in Table 10.

TABLE 10

Equation 18: $u_{i+\frac{1}{2},j} = \frac{u_{i+\frac{1}{2},j}h_{i,j}(\Delta x)^2 + v_x^{par}V_{eff}}{h_{i,j}(\Delta x)^2 + V_{eff}}.$ A similar equation may be used for $w_{i,j+1/2}$. When a splash particle hits the surface a foam particle may be created with some probability, depending on the impact speed of the droplet. The initial positions of particles may be jittered by moving them by a random fraction of a time step. This may make them look as if they were generated somewhere in the middle of the time interval. Some noise may also be added to the initial velocities of the particles.

Foam may be advected by the velocity field of the fluid simulation and projected onto the fluid surface. It may convey a horizontal swirling water motion, in one embodiment.

Breaking waves may not be resolved by a height field model. In a 2D framework, waves that would break in 3 dimensions may produce disturbing ripples due to numerical instabilities. To solve this problem, such waves may be dampened and particles created. A cell (i; j) may be considered to contain a breaking wave if it satisfies all of the following conditions shown in Table 11, which is set forth for illustrative purposes only.

TABLE 11

1. $\frac{h_{i,j} - h_{i,j}^{prev}}{\Delta t} > v_{minSplash}$ // Raising fast and is front of a wave 2. $|\Delta \eta_{i,j}| > \alpha_{minSplash}\frac{g\Delta t}{\Delta x}$ // Steep enough to break 3. $\nabla^2 \eta_{i,j} < l_{minSplash}$ // Is top of a wave Condition 1 in Table 11 requires that the cell is part of the front of a fast raising wave. Condition 2 in Table 11 makes sure that the wave is steep enough. Condition 3 in Table 11 indicates that the grid is near the top of a wave. $V_{minSplash}=4$, $\alpha_{minSplash}=0.45$, $1_{minSplash}=-4$ may be used in various examples. $\nabla h_{i,j}$ may be computed using the maximum among the one-sided derivatives, to allow detection of a fast height change, as shown in Table 12, which is set forth for illustrative purposes only.

TABLE 12

Equation 19: $\nabla \eta_{i,j} = \begin{bmatrix} \frac{\max_{abs}(\eta_{i+1,j} - \eta_{i,j}, \eta_{i,j} - \eta_{i-1,j})}{\Delta x} \\ \frac{\max_{abs}(\eta_{i,j+1} - \eta_{i,j}, \eta_{i,j} - \eta_{i,j-1})}{\Delta x} \end{bmatrix}$ where $\max_{abs}(s,t) = (|s|>|t|)?s:t$.

$\nabla^2 \eta_{i,j}$ may be computed using a central finite differencing as shown in Table 13, for example.

TABLE 12

Figure 4:
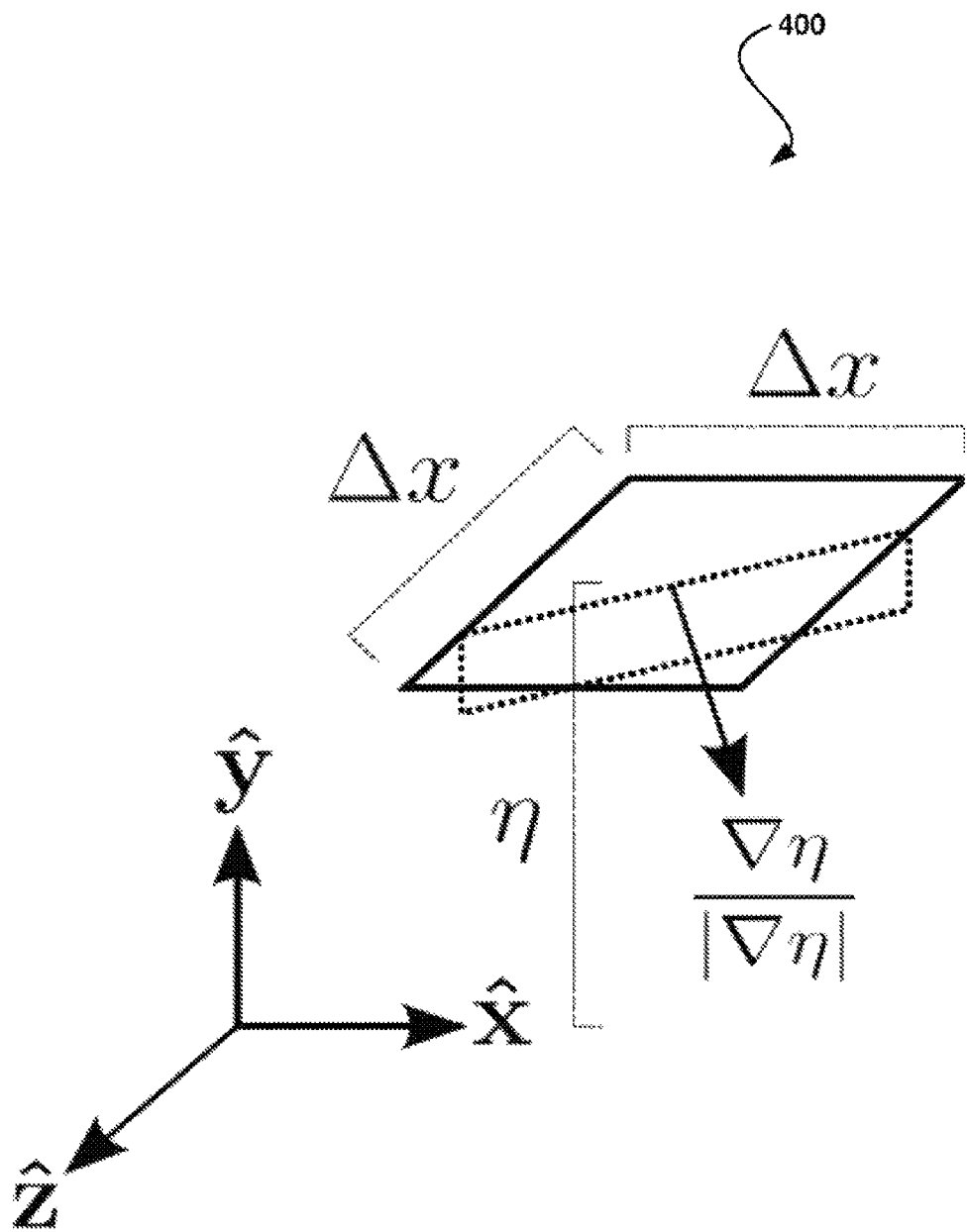
FIG. 4 shows a method for generating breaking wave particles from a height field utilized to depict a body of water, in accordance with still yet another embodiment.

Equation 20: $\nabla^2 \eta_{i,j} = \frac{\eta_{i+1,j} + \eta_{i-1,j} + \eta_{i,j+1} + \eta_{i,j-1} - 4\eta_{i,j}}{(\Delta_x)^2}$ Particles may then be generated within a rectangle whose edges are the y-axis and the line perpendicular to the direction of the gradient passing through the cell center clipped against cell edges, as shown in FIG. 4. The total volume of the added particles may be proportional to $|\nabla \eta_{i,j}|$. These particle positions may be jittered by a uniform noise sampled from $\left[-\frac{\Delta x}{2}, \frac{\Delta x}{2}\right]$.

The x and z components of the particle velocities may be given by the wave velocity and may be clamped to the maximum water depth, $\frac{-\nabla \eta_{i,j} \sqrt{g \min(h_{i,j}, h_{avgmax})}}{|\nabla \eta_{i,j}|}$.

The y component may be $\lambda_y \frac{h_{i,j} - h_{i,j}^{prev}}{\Delta t}$ where $\lambda_y=0.1$ in various examples. A fraction of these particles may also be labeled as spray.

For waterfalls, a face $(i+\frac{1}{2}, j)$ may be treated as a waterfall face if either of the following cases shown in Table 13 are true, for example.

TABLE 13 case 1: $\frac{H_{i,j} - H_{i+1,j}}{\Delta x} > \Delta H_{cap}$ and $H_{i,j} > \eta_{i+1,j}$ or case 2: $\frac{H_{i+1,j} - H_{i,j}}{\Delta x} > \Delta H_{cap}$ and $H_{i+1,j} > \eta_{i,j}$.

In each case shown in Table 13, the left condition states that the terrain slope is larger than $\Delta H_{cap}$, where 3/2 may be used in various examples. This may indicate an approximate discontinuity in the terrain height. The right condition detects whether the lower end of the waterfall is already filled to the same level as the higher end.

Figure 5:
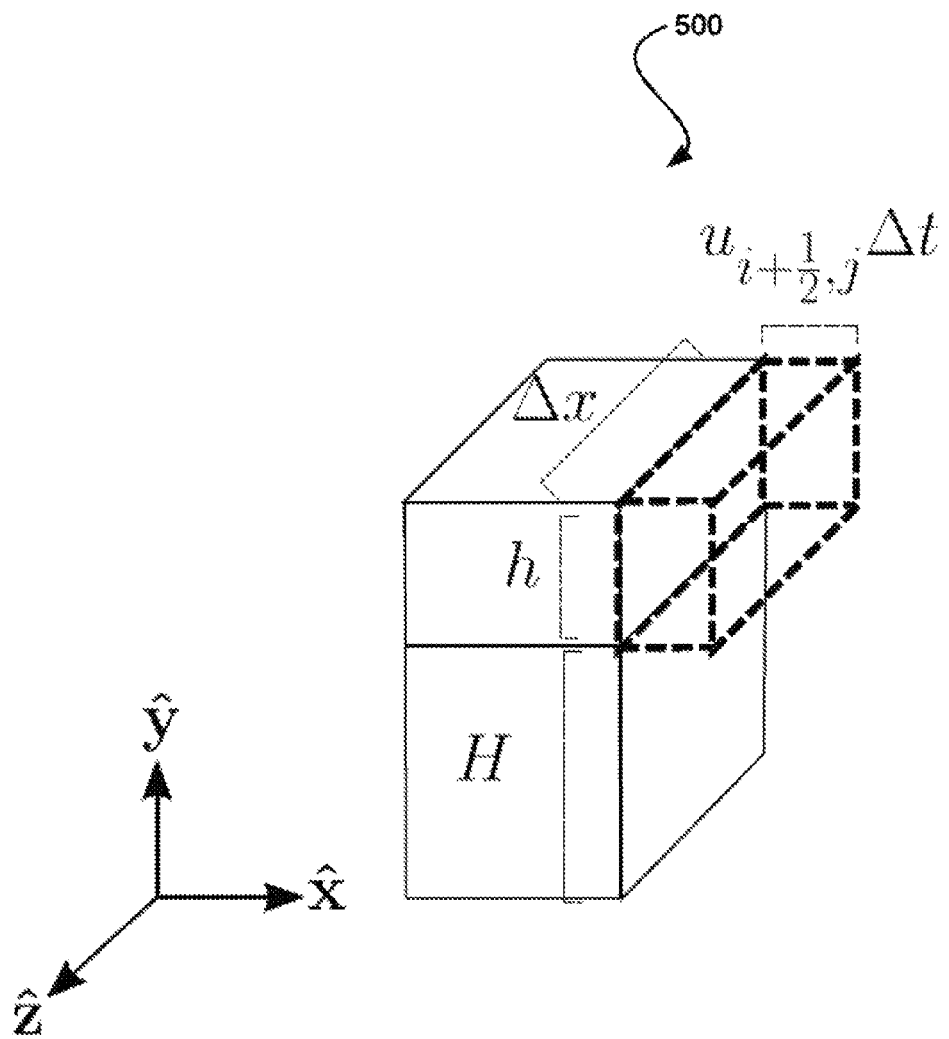
FIG. 5 shows a method for generating splash particles from a height field utilized to depict a body of water, in accordance with still yet another embodiment.

Splash particles may be generated by sampling uniformly over an axis aligned bounding box defined by $p_{min}^{wf}$ and $p_{max}^{wf}$ shown in FIG. 5. Their velocities may be set to $v^{wf}$. This bounding box may represent the volume of the fluid that would flow across the face $(i+\frac{1}{2},j)$ during the current time step. These variables may be computed using the algorithm shown in Table 14, which is set forth for illustrative purposes only.

TABLE 14 if $\eta_{i+1,j} < H_{i,j}$ then $v^{wf} = \left[u_{i+\frac{1}{2},j}, 0, \frac{w_{i,j+\frac{1}{2}} + w_{i,j-\frac{1}{2}}}{2}\right]^T$ $p_{min}^{wf} = [i\Delta x, H_{i,j}, j\Delta x]^T$ $p_{max}^{wf} = \left[i\Delta x + u_{i+\frac{1}{2},j} \Delta t, \eta_{i,j}, (j+1)\Delta x\right]^T$ else $v^{wf} = \left[u_{i+\frac{1}{2},j}, 0, \frac{w_{i+1,j+\frac{1}{2}} + w_{i+1,j-\frac{1}{2}}}{2}\right]^T$ $p_{min}^{wf} = \left[(i+1)\Delta x + u_{i+\frac{1}{2},j} \Delta t, H_{i+1,j}, j\Delta x\right]^T$ $p_{max}^{wf} = [(i+1)\Delta x, \eta_{i+1,j}, (j+1)\Delta x]^T$ end if The volume of the splash particles may not be subtracted from the height field because the modified height integration step explained below may already take this into account. The height and velocity integration may be modified as shown in Table 15, for example.

TABLE 15 case 1:
Replace $u_{i+\frac{1}{2},j}$ with 0 when updating $h_{i+1,j}$.

Replace Eq 8 with $u_{i+\frac{1}{2},j} -= g\Delta t\left(-\frac{h_{i,j}}{\Delta x} - \Delta H_{cap}\right)$.

case 2:
Replace $u_{i+\frac{1}{2},j}$ with 0 when updating $h_{i,j}$.

Replace Eq 8 with $u_{i+\frac{1}{2},j} -= g\Delta t\left(-\frac{h_{i+1,j}}{\Delta x} + \Delta H_{cap}\right)$.

These modifications may have the effect that the cell at the top and the one at the bottom of the waterfall are separated by a reflecting boundary. The volume that would flows across this boundary may be carried by the particles instead. The waterfall particle generation algorithm may not only enhance the visual richness of the scene, but may also make the simulation more stable because steep terrain slopes cause numerical instabilities. The advection of quantities along the velocity field may have to be modified as well to make sure that they are not traced up the waterfall, but may not necessarily introduce visual artifacts if ignored. Waterfall faces (i+½,j) may be detected and treated in a similar manner.

Splashes and sprays may also be generated when rigid and soft bodies interact with the fluid. Each surface triangle of the solid may be identified and checked if it sweeps through the height field during the current time step and its speed is above a threshold, $v_{thres}$. If so, the triangle may be samples uniformly by recursive subdivision, as described above with respect to FIG. 3A. The subdivision may stop when the area is roughly the same as the size of splash particles. To avoid regular patterns, the sample positions may be jittered slightly. For each sample, it may be checked whether it sweeps through the height field. If so, splash particles may be generated. For example, let $p^S$, $v^S$, $n^S$ be its position, velocity and normal found by barycentric interpolation from the original triangle and let $v^S_{fluid}$ be the fluid velocity at $p^S$. The velocity of the particles generated, $v_{par}$, may be computed using the algorithm shown in Table 16, for example.

TABLE 16

$v_{rel} = v^S - v_{fluid}^S$; $v_m = (v_{rel} \cdot n^S)n^S$; $v_{rp} = v_{rel} - v_m$
$v_{par} = v_{fluid}^S + \alpha_m v_m + \alpha_p v_{rp} + \alpha_n n^S |v_{rel} \cdot \hat{y}| + \alpha_r (v_{rel} - 2(\hat{y} \cdot v_{rel})\hat{y})$.

$\alpha_m$, $\alpha_p$, $\alpha_n$, may control the look of the splashes. Particles may then be generated at $p^S + 2rin^S$, where $0 \leq i < n$, with initial velocity $v_{par}$. n may be made proportional to $|v^S| - v_{thres}$. The position of these particles may be jittered randomly within the radius r.

Still yet, as shown in operation 212, the height field and the particles are rendered. For example, after a timestep, a newly updated state of the height field and the particles may have been generated (based on the calculations described above). Such newly updated height field and particles may therefore be rendered. In one embodiment, the height field and particles may be rendered to convey the complex flow features of the body of water and to enhance the surface details of the body of water.

In one embodiment, the height field may be rendered with an additional displacement map that represents small waves with wave lengths below the resolution of the height field. Further, the splash particles may be rendered with a screen space technique, as described below.

The height field fluid may be thought of as a rectangular grid of quads over the x-z plane. $\eta_{i,j}$ may determine the y-coordinate of the vertex (i, j) of the grid. Each quad can be split into two triangles in two ways. Silhouette artifacts may be reduced by picking the diagonal that better aligns with wave crests. Diagonal (i, j)–(i+1,j+1) may be picked if $\eta_{i,j} + \eta_{i+1,j+1} > \eta_{i+1,j} + \eta_{i,j+1}$, otherwise, diagonal (i+1,j)–(i,j+1) may be picked. This test can be implemented efficiently on the GPU using a geometric shader. To improve the appearance of the water surface further, the waves may be made to look choppy. This can be achieved by replacing vertex coordinates (x, z) with $$\left(x + c\frac{\partial \eta}{\partial x}, z + c\frac{\partial \eta}{\partial x}\right),$$

where c>0 is a user-defined constant to control the choppiness. The displacement may also be clamped in each direction not to exceed $\Delta x/2$ to avoid self intersections.

As noted above, the height field may be rendered with an additional displacement map that represents small waves with wave lengths below the resolution of the height field. It should be noted that while such technique is described in the context of FIG. 2, the technique may be implemented for any desired content depicting a body of water that includes waves.

For example, in one embodiment, content depicting a body of water including waves of at least a predetermined size may be identified. Additionally, a height field may be generated for the content. For example, the height field may be generated for the body of water. Still yet, rendering of the height field may be enhanced by adding waves of less than the predetermined size to the body of water. More information describing the aforementioned embodiment is presented below.

The height field simulation described with respect to operation 204 may be incapable of resolving waves with wave lengths smaller than the grid resolution $\Delta x$. With the constraint of being real-time, decreasing $\Delta x$ further may not be an option because this may increase the number of cells and require a smaller time step $\Delta t$ for a stable simulation. Instead, smaller waves may be added on top of the height field with the following properties shown in Table 17, which is set forth for illustrative purposes only.

TABLE 17

1. They should be advected with the velocity field.
2. They must not be distorted excessively over time.
3. They disappear if being stretched too much.
4. The method must be relatively cheap.

A fast Fourier transform (FFT) based wave simulation, as described in "Fourier synthesis of ocean scenes" by G. A. Mastin, P. A. Watterberg, and J. F. Mareda (IEEE Comput. Graph. Appl. 7, 3, 1987) and "Simulating ocean water" by J. Tessendorf (sig-graph course notes, 1999), with periodic boundary conditions may be used to generate a high resolution wave texture F(s, t) and this texture may be looked up for the additional sub-grid displacements of the height field. The FFT wave texture may optionally only contain high frequency waves. The texture coordinates and the weights used for modulating the additional displacement may be computed on the grid points and may be bi-linearly interpolated per pixels for the final rendering. Thus, varying weight FFT waves may be generated.

The method presented in "Flow visualization using moving textures" by N. Max, and B. Becker (Proceedings of the LCAS/LaRC Symposium on Visualizing Time-Varying Data, 1996) may be used for the texture coordinates re-generation and texture blending. For each grid cell (i, j) three sets of texture coordinates $$(s_{i,j}^k, t_{i,j}^k), k = 1..3$$

may be stored which are initialized with (i$\Delta$x, j$\Delta$x). They may be transported with the velocity field using semi-lagrangian advection.

$$(s_{i,j}^k, t_{i,j}^k)$$

may be reset to (i$\Delta$x, j$\Delta$h) every t seconds with a phase shift of $\tau/3$ between k and (k+1)mod 3. The weight used for multiplying the displacement $\omega_{i,j}$ may depend on how much the velocity field would stretch the wave. $\omega_{i,j} = e^{-\Omega \mu ij}$ may be used, where $$\mu_{i,j} = \max_{k=1}^{3} \mu_{i,j}^{k}, \mu_{i,j}^{k}$$

j is the absolute value of the eigenvalue with maximum magnitude of the Green strain of $(s^k, t^k)$ at $(i, j)$. The Green strain can be computed as shown in $\frac{1}{2}(DD^T-1)$, where $$D = \begin{bmatrix} \frac{\partial s^k}{\partial x} & \frac{\partial s^k}{\partial y} \\ \frac{\partial t^k}{\partial x} & \frac{\partial t^k}{\partial z} \end{bmatrix}.$$

$\Omega > 0$ may control how fast the small waves disappear with stretching, for which values between 0.5 to 2 may be used in various examples. The final displacement for a pixel may be $$\omega \sum_{k=1}^{3} w_k F(s^k, t^{k-})$$

where $\omega$, $s^k$, $t^k$ are bi-linearly interpolated from the grid, $$w_k = \frac{1}{3}\left(1 - \cos\left(2\pi \frac{t - t_0^k}{\tau}\right)\right)$$

is the last time the set k is regenerated. The phase shift may ensure a constant blending weight. The choice of τ may trade off the distortion of the texture coordinates against the coherency of the waves. $1 < \tau < 3$ seconds may be used in various examples. Another texture coordinate regeneration method may also be adapted, as presented by "Proceedings of the 2003 ACM SIGGRAPH/Eurographics symposium on Computer animation" by F. Neyret (Aire-la-Ville, Switzerland, 2003), to not have to make this tradeoff.

The splash particles may be rendered using the screen space technique presented by "Screen space fluid rendering with curvature flow" by W. J. Van Der Laan, S. Green, and M. Sainz (In I3D '09: Proceedings of the 2009 symposium on Interactive 3D graphics and games, New York, N.Y., USA, 2009) with the modification of using a bi-lateral filter with support radius defined in world space "Sph fluid rendering" by M. S. Rouslan Dimitrov (in submission to siggraph talk, 2010), so that the fluid appearance is view-independent. For the final rendering of the particle surface, the same pixel shader may be used as the one for rendering the height field.

Spray particles may be rendered as an elongated ellipse along the direction of their velocity to emulate the motion blur effect, as in Van Der Laan et al. Foam particles may be rendered as diffuse disks whose normal are obtained from the height field water surface. A more sophisticated technique using foam textures could be used as another option, as described in "Deep-Water Animation and Rendering" by R. G. Lasse Staff Jensen Golias.

Figure 6:
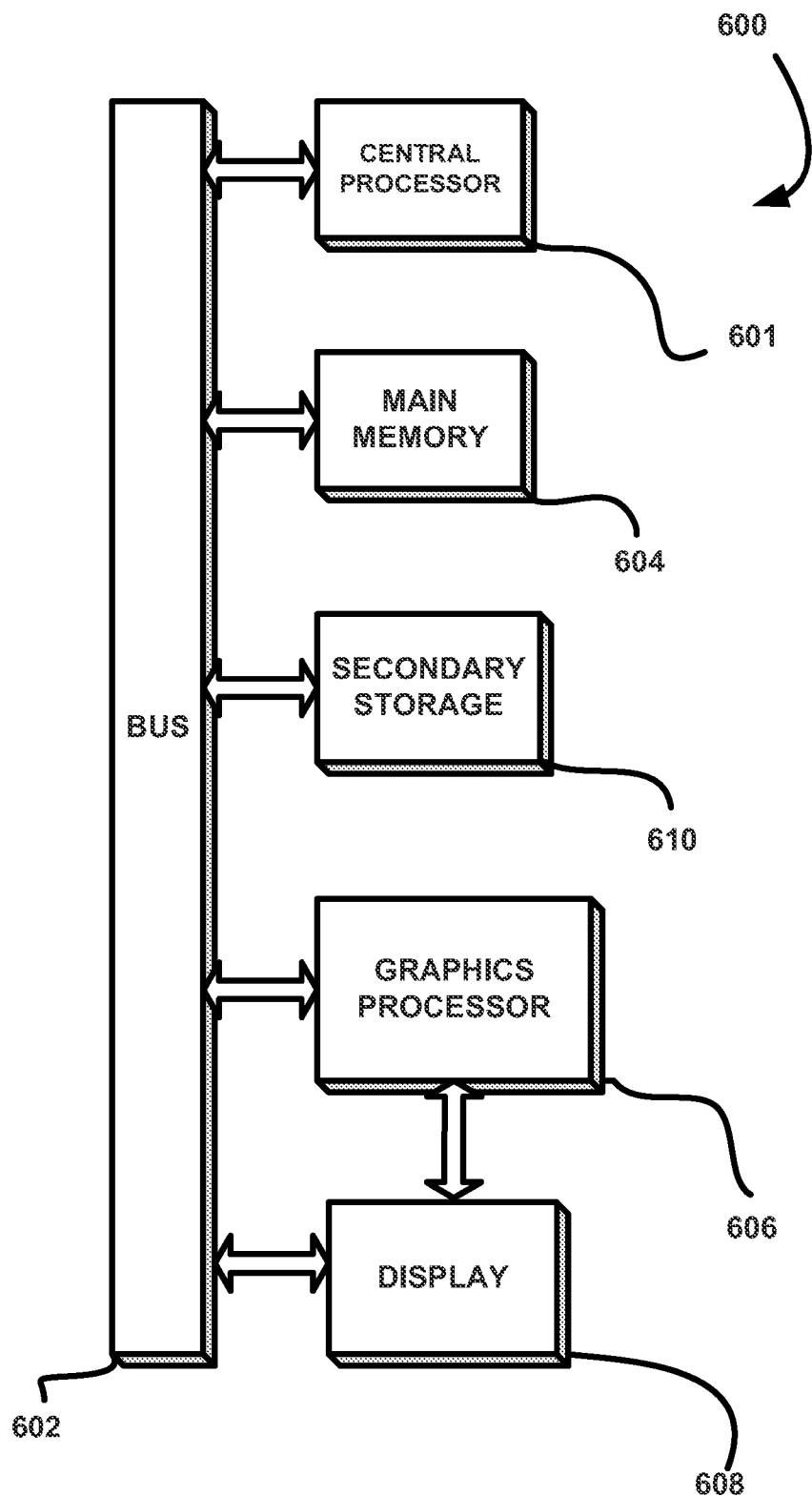
FIG. 6 illustrates an exemplary system in which the various architecture and/or functionality of the various previous embodiments may be implemented.

By implementing the method 200 described above, stability may be enhanced and the handling of arbitrary terrain slopes and arbitrary water depth may be allowed. Furthermore, criteria for automatically detecting surface discontinuities, such as waterfalls, may be utilized, and a method may be provided to turn the liquid volume in such locations into particles that carry mass and momentum of the height field across the discontinuity. Further, small scale FFT-based ripples on the water surface may be automatically created and advected, criterions may be utilized to detect breaking waves and height field fluid may be turned into particles creating spray, splash and foams. Moreover, waves at the boundary of the simulation domain may be absorbed for handling open water scenes FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices m including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

APPENDIX A

Equation 21: $h_{i,j} \mathrel{+}= (-\gamma_{i,j}(h_{i,j} - h_{rest}) + \psi_{i,j})\Delta t$ Equation 22: $w_{i,j+\frac{1}{2}} \mathrel{+}= -\frac{1}{2}(\gamma_{i,j+1} + \gamma_{i,j})w_{i,j+\frac{1}{2}}\Delta t$ Equation 23: $\Psi_{i,j} \mathrel{+}= -\lambda_{update}\Psi_{i,j}\frac{\left(u_{i+\frac{1}{2},j} - u_{i-\frac{1}{2},j}\right)}{\Delta x}\Delta t$ Equation 24: $\psi_{i,j} \mathrel{\times}= \lambda_{decay}$ The field $\Psi$ may be evolved only in the regions where z-moving waves are to be dampened. $\gamma$ may play the same role as $\sigma$, as described above with respect to operation 204 of FIG. 2.

What is claimed is:

1. A method, comprising:
   identifying content depicting a body of water;
   generating, utilizing a processor, a height field for the content;
   identifying cells within at least a portion of the height field as associated with a breaking wave by comparing, for each cell, a change in water depth of the cell during a time step with a predetermined value corresponding to a top of a wave;
   generating a plurality of particles based on the identified cells within the at least a portion of the height field; and
   updating the height field based on the plurality of particles.

2. The method of claim 1, wherein the content is identified further in response to a determination that the content is currently being displayed by a display device.

3. The method of claim 1, wherein each of the particles includes at least one of spray, splash, and foam.

4. The method of claim 3, wherein the spray and the splash are generated based on a solid body interacting with the body of water, such that each surface triangle of the solid body is identified and checked to determine if the surface triangle sweeps through the height field during a current time step and with a speed above a predefined threshold.

5. The method of claim 4, wherein at least one of the splash particles is generated in response to one of the surface triangles of the body sweeping through the height field during the current time step and with a speed above the predefined threshold.

6. The method of claim 5, wherein, in response to the one of the surface triangles of the body sweeping through the height field during the current time step and with the speed above the predefined threshold, the one of the surface triangles of the body sweeping through the height field is recursively subdivided into a plurality of smaller sub-triangles until an area of the smaller sub-triangles is substantially equal to a size of the splash particles.

7. The method of claim 1, further comprising identifying a portion of the content depicting a solid body.

8. The method of claim 7, further comprising simulating the solid body.

9. The method of claim 8, further comprising performing two-way coupling of the height field and the solid body prior to the generating of the plurality of particles.

10. The method of claim 1, further comprising rendering the height field and the particles.

11. The method of claim 1, wherein identifying the cells further comprises comparing a difference of water surface height with a predetermined value corresponding to a steepness of a wave.

12. The method of claim 1, wherein identifying the cells further comprises comparing a central finite difference of a water surface height with a predetermined value corresponding to a top of a wave.

13. The method of claim 1, wherein a total volume of the plurality of particles is proportional to a difference of water surface height.

14. The method of claim 1, wherein the updating of the height field comprises removing mass and momentum associated with the plurality of particles.

15. The method of claim 1, further comprising adding waves having wave lengths smaller than a resolution of a grid of the height field to the body of water.

16. The method of claim 1, wherein initial positions of the plurality of particles are jittered by a fraction of a time step.

17. A computer program product embodied on a non-transitory computer readable medium, comprising:
   computer code for identifying content depicting a body of water;
   computer code for generating a height field for the content;
   computer code for identifying cells within at least a portion of the height field as associated with a breaking wave by comparing, for each cell, a change in water depth of the cell during a time step with a predetermined value corresponding to a top of a wave;
   computer code for generating a plurality of particles based on the identified cells within the at least a portion of the height field; and
   computer code for updating the height field based on the plurality of particles.

18. The computer program product of claim 17, wherein the computer code for identifying the cells further comprises computer code for comparing a difference in a water surface height with a predetermined value corresponding to a steepness of a wave.

19. The computer program product of claim 17, wherein the computer code for identifying the cells further comprises computer code for comparing a central finite difference of a water surface height with a predetermined value corresponding to a top of a wave.

20. An apparatus, comprising:
   a processor for:
      identifying content depicting a body of water;
      generating a height field for the content;
      identifying cells within at least a portion of the height field as associated with a breaking wave by comparing, for each cell, a change in water depth of the cell during a time step with a predetermined value corresponding to a top of a wave;
      generating a plurality of particles based on the identified cells within the at least a portion of the height field to a plurality of particles; and
      updating the height field based on the plurality of particles.

21. The apparatus of claim 20, wherein identifying the cells further comprises comparing a difference in a water surface height with a predetermined value corresponding to a steepness of a wave.

22. The apparatus of claim 20, wherein identifying the cells further comprises comparing a central finite difference of a water surface height with a predetermined value corresponding to a top of a wave.

23. A method, comprising:
- identifying content depicting a body of water including waves of at least a predetermined size;
- generating, utilizing a processor, a height field for the content; and
- enhancing rendering of the height field by adding waves having wave lengths smaller than a resolution of a grid of the height field to the body of water.

24. The method of claim 23, wherein the waves having wave lengths smaller than a resolution of a grid of the height field are added on top of the height field.

\* \* \* \* \*